Jan. 31, 1950  F. E. WOLCOTT, JR  2,495,996
FILTER FOR COFFEE MAKERS
Filed Feb. 3, 1945
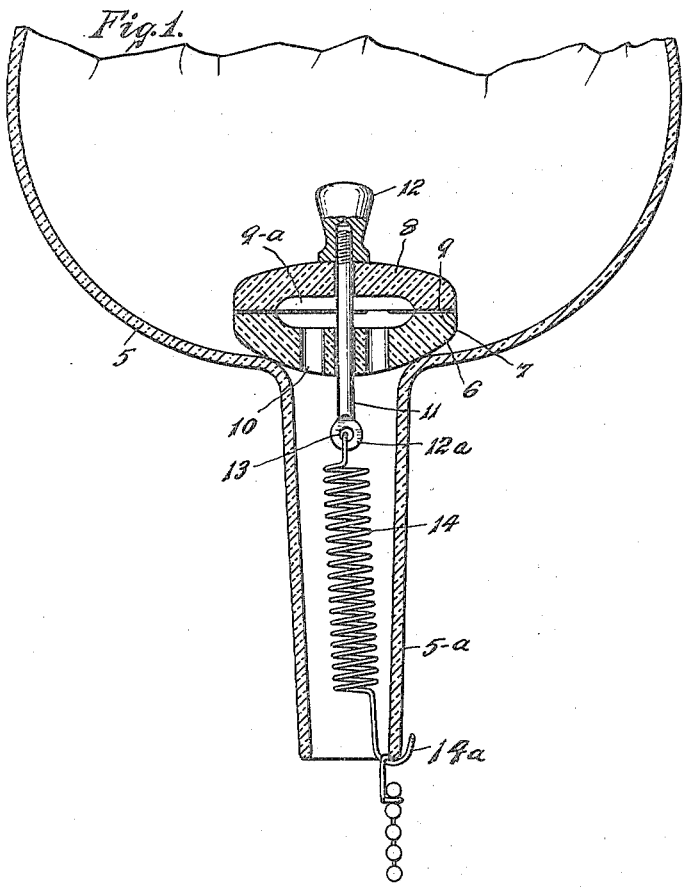
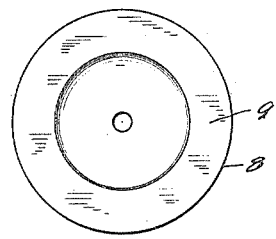
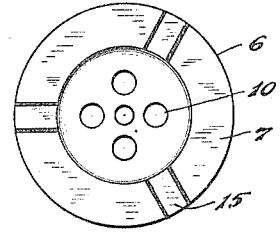
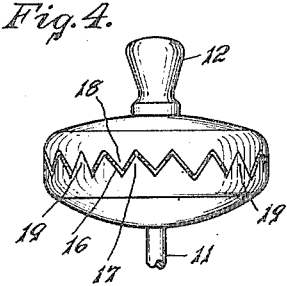
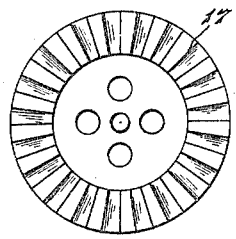
Inventor
FRANK E. WOLCOTT JR.
By Louis V. Lucia
Attorney Patented Jan. 31, 1950

2,495,996

UNITED STATES PATENT OFFICE 2,495,996

FILTER FOR COFFEE MAKERS

Frank E. Wolcott, Jr., West Hartford, Conn., assignor to The Silex Company, Hartford, Conn.

Application February 3, 1945, Serial No. 575,965

2 Claims. (Cl. 210—162)

This invention relates to filters and more particularly to filters such as are intended for use in vacuum type coffee makers having an upper and lower bowl in which the water is heated in the lower bowl and forced into the upper bowl wherein it is infused with coffee grounds, then drawn into the lower bowl by vacuum therein, leaving the coffee grounds in the upper bowl.

The object of this invention is to provide a filter which requires no cloth, which is sanitary, easy to clean, and highly efficient in its operation.

Further objects and advantages of this invention will be more clearly understood from the following description and from the accompanying drawings in which:

Fig. 1 is a side view, in central vertical section, showing my improved filter as positioned within the upper bowl of a coffee maker.

Fig. 2 is an elevational bottom view of the upper member of said filter.

Fig. 3 is an elevational plan view of the lower member.

Fig. 4 is an elevational side view of a modified form of said filter.

Fig. 5 is an elevational plan view of the lower member thereof.

As illustrated in the drawings, the numeral 5 denotes the upper bowl of a vacuum type coffee maker having the usual stem 5—a depending therefrom.

My improved filter may consist of a lower disk-shaped member 6 preferably made of glass, or other similar material, and having an annular flat surface 7 adapted to support an upper disk 8 having an annular flat surface 9.

Both of said disks are recessed centrally in order to provide a clearance or chamber 9—a communicating the passages between the said annular surfaces with the passages 10 in the bottom of the lower member.

In order to retain the said members in cooperating position, I provide a rod 11 which extends through both members and is threaded at the upper end to a knob 12, serving as a handle for the filter. The lower end of said bar is flattened, as at 12—a, and provided with an opening 13 for the attachment of a spring member 14 which is provided with a hook 14—a that is adapted to engage the lower end of the stem 5—a of the upper bowl.

The operation of my improved filter is as follows:

When the water is passing from the lower bowl, upwardly through the stem 5—a, into the upper bowl, it will pass through the openings 10 into the chamber 9—a and between the upper and lower disks 6 and 8 into the upper bowl. As the said water is forced upwardly with a certain amount of pressure, it will have a tendency to lift the upper member 8 away from the member 6 so as to permit easier passage of the water.

After the infusion, the brew will move from the upper bowl towards the lower bowl. This will cause the upper member 8 to become firmly seated upon the lower member 6, thus insuring proper filtration of the brew as it passes between the surfaces 7 and 9 of the said two members and then through the openings 10 and the stem 5—a into the lower bowl.

In practice, it has been found that the surfaces 7 and 9 could be formed slightly irregular so as to provide enough clearance, or spacing, between the upper and lower filtering members to permit the liquid to pass through and still prevent the coffee grounds from passing through with the liquid. It is desired, however, to provide preferably three bosses 15 on either of the filtering surfaces 7 or 9 so as to space the upper and lower filtering members slightly apart and thereby insure proper spacing for most efficient filtering operation.

A filter of this type is highly efficient for the reason that it provides a long filtering space, or slit, along the periphery of the filter, which will permit the liquid to pass through from the upper bowl into the lower in a sufficiently rapid and highly desirable manner.

In the modified form shown in Fig. 4, this efficiency is materially increased by staggering the filtering surfaces of the said upper and lower members to provide a staggered slit 16 which, being staggered, is of a relatively greater length than a straight slit, and which is formed by upper and lower intermeshing prongs 17 and 18. This slit may be retained of a uniform width by means of locating prongs 19, in either one of the members, which will contact between two of the opposed prongs and thus space the other prongs uniformly. It has been found desirable to use three of the prongs 19 around the filtering member for better support.

Due to the novel construction of my improved filter, it is possible to remove the filter from the upper bowl and separate the lower and upper members 6 and 8 by sliding the member 6 on the rod 11, so that any sediment or accumulation may be washed away from between said members and thereby insuring a filter which is sanitary and will always operate at its maximum efficiency,

I claim:

1. A filter of the character described comprising a lower disk-shaped member having an upper member superimposed thereon; the said lower disk having openings extending therethrough and a row of radially extending ribs, an upper member superimposed upon the lower member and having a bottom surface provided with a row of radially extending ribs corresponding to and intermeshing with the ribs in the lower disk, and a plurality of spaced projecting ribs on one of said disks adapted to engage between adjacent ribs of the opposite disk to relatively position said disks and to provide a staggered slit between said disks permitting filtration therethrough.

2. A filter of the character described comprising upper and lower disc-shaped members in superimposed position, each of said members having an annular marginal surface provided with radially extending bosses having angularly disposed sides meeting at a point on said bosses; the said bosses intermeshing with similar bosses on the opposite disc, and a plurality of spaced bosses on one of said discs fitting between bosses on the opposite disc and supporting the discs with the intermediate bosses in spaced position to provide narrow staggered slits between said bosses for filtration of liquid therethrough, and an opening in the bottom of the lower disc communicating with said slit.

FRANK E. WOLCOTT, Jr.

REFERENCES CITED

The following references are of record in the file of this patent:

UNITED STATES PATENTS

| Number | Name | Date |
|---|---|---|
| 1,787,634 | Laubner | Jan. 6, 1931 |
| 2,027,826 | Keaton | Jan. 14, 1936 |
| 2,234,678 | Matson | Mar. 11, 1941 |
| 2,269,956 | Rewner | Jan. 13, 1942 |
| 2,386,433 | Carter et al. | Oct. 9, 1945 |
| 2,387,322 | Francis | Oct. 23, 1945 |

FOREIGN PATENTS

| Number | Country | Date |
|---|---|---|
| 129,859 | Great Britain | July 24, 1919 |